Patented Jan. 16, 1945

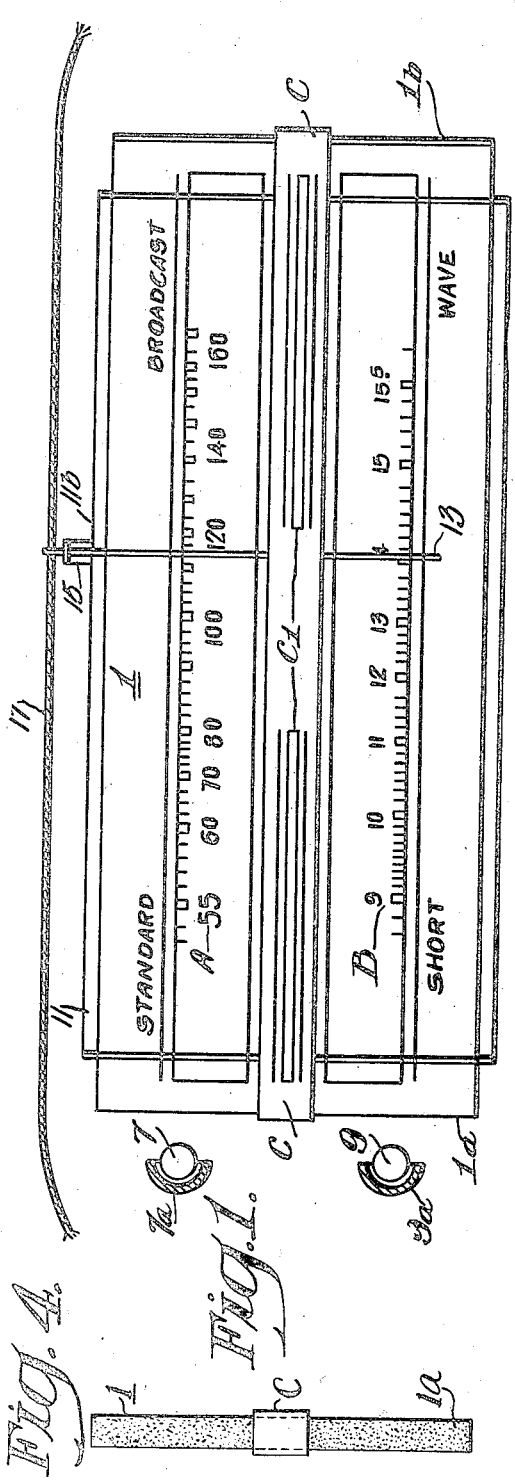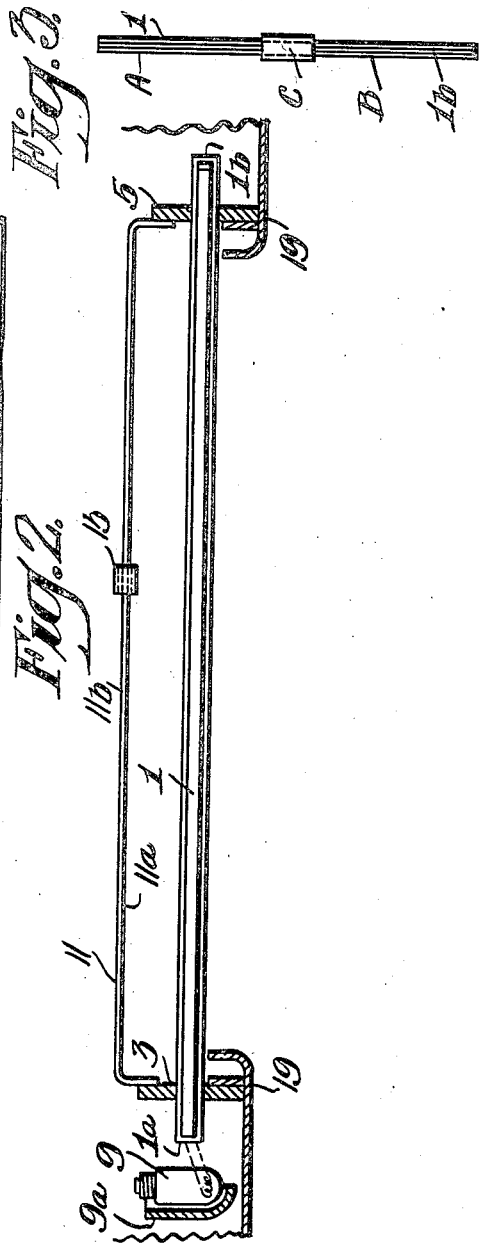

2,367,577

UNITED STATES PATENT OFFICE 2,367,577

INDICATOR

Sheldon C. Hayward, Merchantville, N. J., assignor to Radio Corporation of America, a corporation of Delaware Application February 2, 1942, Serial No. 429,228

3 Claims. (Cl. 40—130)

My present invention relates to illuminated indicators, such, for example, as tuning indicators for radio receivers, display signs, computing scales, etc., and has special reference to the provision of an improved indicator of the type incorporating a plurality of separately illuminable scales or other indicia.

The prior art recognizes two general types of selectively illuminated multi-scale indicators. These are (a) the projection type, and (b) edge lighted. In the projection type indicator a translucent scale bearing surface is illuminated from the rear; the light being confined to a given scale as by means of a movable shutter or mask (see Maris 2,193,107), or by relative movement between the scale plate and light source (see Curtis, et. al. 1,877,228). Irrespective of the advantages claimed for projection type indicators it may be said, generally, that they are expensive and, further, are cumbersome in that they occupy cabinet space which might otherwise be usefully employed. Edge lighted indicators, while far less cumbersome than those of the projection type, are nevertheless expensive since they have heretofore required the use of a scale bearing surface constituted of several glass sections (one for each scale) joined into a continuous surface by interposed layers of an opaque material which serve to confine the light to a given scale. (As to this see White 1,741,748; Brodton 2,132,094.)

Accordingly, the principal object of my present invention is to provide an improved, selectively illuminated multi-scale indicator and one which obviates the foregoing and other less apparent objections to analogous prior art indicators.

A related and more specific object of my invention is to provide a simple and economical means for selectively illuminating the individual scales of a multi-scale tuning indicator, so that the operator's attention is immediately attracted to the scale for which the range selector control is set.

Other objects and advantages will be apparent and my invention itself will be best understood by reference to the following specification and to the accompanying drawing, wherein Figure 1 is a front elevation; Figure 2 is a top plan view partly in section; Figures 3 and 4 are opposite elevational views of a plural scale radio tuning indicator embodying my invention.

My invention is predicated upon my discovery that if the rays of light from a lamp mounted adjacent an edge of a single sheet or plate of glass, or equivalent transparent or translucent material, are subjected to what I may designate as "progressive reflection," the light may be confined to a given scale bearing area by means of an opaque band or ribbon applied to the outer (exposed) surface of the said plate adjacent the boundary of said scale bearing area. Hence I am able to dispense with the opaque inserts and separate scale-bearing surfaces of the prior art and mark all of the scales (or other indicia) on a single glass or equivalent translucent plate.

By "progressive reflection" I meant transmission of the light rays in a zig-zag path in the body of the glass by a series of reflections at the major surfaces thereof. It may be pointed out that "progressive reflection" obtains but to a minor or incidental degree in a conventional smooth surface transparent plate when subjected to light rays applied and transmitted through the plate in a direction substantially parallel to the major surfaces thereof.

While my invention is not limited by any theory of operation I am inclined to believe that when the light is subjected to "progressive reflection" the majority of the rays are soon directed to the surface of the scale-bearing plate (instead of being confined to the body thereof), where they are absorbed, or otherwise prevented from spreading, by the opaque band or ribbon between the several scales.

In the drawing, wherein like reference characters are given to the same or corresponding parts in all figures, I designates generally a single, transparent, or translucent scale-bearing plate which may be constituted of ordinary glass, "Lucite" (i. e., methyl methacrylate resin) or equivalent material, supported in a frame comprising a pair of slotted uprights 3 and 5 into which the glass is fitted. One of the minor surfaces $1a$ of the translucent plate 1 is exposed to light from a source exemplified by the separate lamps 7 and 9 and reflectors $7a$, and $9a$, respectively. A back plate 11 having an opaque, preferably dark, front face $11a$ is supported as on the uprights 3 and 5 behind the transparent scale bearing surface 1.

The top edge of the back plate 11 comprises a track $11b$ for a pointer 13 which may be moved therealong on a suitable carriage 15 as by means of a cord 17. A front panel or escutcheon 19 (Fig. 2) frames the scale bearing portion of the plate 1 and conceals the uprights 3 and 5, the lamps 7 and 9, the carriage 15 and the pointer driving means 17, from view.

The transparent plate 1 is provided, in the instant case, with two scales A and B, respectively, which are separated, in accordance with my invention, by means of a layer C, constituted of paint, ink, or other preferably black opaque material applied preferably in the form of a continuous band or ribbon on the exposed major and minor surfaces of the said plate 1. The opaque material may be omitted from one of the major and one or both of the minor surfaces of the plate, if desired. An ornamental design, trade-mark of the like, may be applied to the front surface of the opaque ribbon C, as indicated at C'.

As shown in Fig. 1, the lamps 7 and 9 are mounted on opposite sides of the opaque ribbon C. Thus the lamp 7 supplies light for the top band scale A while the lamp 9 serves to illuminate the bottom scale B. As in standard practice the lamps 7 and 9 are adapted to be selectively energized under the control of a suitable switch (not shown) operated in synchronism with a conventional range change mechanism with which the set will be understood to be provided.

As previously indicated, in order that the opaque ribbon or band C may serve effectively to prevent the transmission of light from a given lamp from being transmitted to a scale other than the one to which it is allotted, it is desirable to subject the light rays to progressive reflection within the glass so that they eventually reach the coated surface area where they are absorbed. To ensure such "progressive reflection," I prefer to grind, etch or otherwise roughen or stipple the minor surface or surfaces 1a of the scale bearing plate 1 though, alternatively, I can achieve substantially the same effect without roughening the glass by so mounting the lamps (or their filaments) that the light rays therefrom impinge the edge of the scale bearing plate at an angle, as indicated in Fig. 2, instead of being directed thereon in paths substantially parallel to the major surfaces of said plate.

As taught in my copending application Serial No. 332,646 (now U. S. P. 2,293,138), I may provide a reflecting surface 1b on that minor surface of the plate 1 which is opposite the minor surface 1a upon which the light is directed. Further, as taught in my said earlier filed application, I may utilize the same source of light for illuminating the pointer 13. Various other modifications will suggest themselves to those skilled in the art. It is to be understood therefore that the foregoing is to be interpreted as illustrative and not in a limiting sense except as required by the prior art and by the spirit of the appended claims.

What is claimed is:

1. In a plural scale indicator of the type incorporating a plurality of separate sources of light for selectively illuminating said scales, the combination with a unitary translucent plate provided with a plurality of scale-bearing areas and having a roughened minor surface upon which light from said source is adapted to impinge, of a light absorbent member mounted contiguous to a major surface of said translucent plate between said scale-bearing areas and comprising a barrier for preventing the transmission of light from the selected of said sources through the selected to the non-selected of said scales.

2. The invention as set forth in claim 1 and wherein said light-absorbing member comprises an adherent ribbon-like film.

3. A device of the character described comprising a translucent plate having a plurality of scale bearing areas thereon, a separate source of light for each of said scale bearing areas mounted adjacent a minor surface of said translucent plate for selectively illuminating said scale bearing areas, and means comprising an adherent ribbon-like film constituted of a light-absorbent material on a major surface of said plate intermediate said scale bearing areas for preventing spreading of said light from a selected to a non-selected of said scale bearing areas.

SHELDON C. HAYWARD.